United States Patent
Lei et al.

(10) Patent No.: US 10,807,545 B2
(45) Date of Patent: Oct. 20, 2020

(54) TEMPERATURE-BASED EMBEDDED MODEM FEATURE SCALING

(71) Applicant: FORD GLOBAL TECHNOLOGIES, LLC, Dearborn, MI (US)

(72) Inventors: Oliver Lei, Windsor (CA); Allen R. Murray, Lake Orion, MI (US); David Tengler, West Bloomfield, MI (US); Ritesh Pandya, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 15/812,137

(22) Filed: Nov. 14, 2017

(65) Prior Publication Data

US 2019/0143915 A1    May 16, 2019

(51) Int. Cl.
*B60R 16/023*   (2006.01)
*H04W 4/40*     (2018.01)
*B60Q 9/00*     (2006.01)
*H04W 4/38*     (2018.01)
*H04W 4/20*     (2018.01)

(52) U.S. Cl.
CPC ...... *B60R 16/0232* (2013.01); *B60R 16/0237* (2013.01); *H04W 4/40* (2018.02); *B60Q 9/00* (2013.01); *H04W 4/203* (2013.01); *H04W 4/38* (2018.02)

(58) Field of Classification Search
CPC ... B60R 16/027; B60R 16/03; H04W 4/20–48
See application file for complete search history.

(56) References Cited

U.S. PATENT DOCUMENTS

| | | | |
|---|---|---|---|
| 5,414,416 A * | 5/1995 | Yamakita | B60R 16/0315 340/3.1 |
| 9,018,804 B2 | 4/2015 | Saladin et al. | |
| 9,043,797 B2 | 5/2015 | Rabii | |
| 9,146,814 B1 * | 9/2015 | van der Merwe | G06F 11/3031 |
| 2005/0136892 A1 * | 6/2005 | Oesterling | H04L 63/08 455/411 |
| 2006/0268512 A1 * | 11/2006 | Foster, Sr. | G06F 1/206 361/695 |
| 2011/0257973 A1 * | 10/2011 | Chutorash | G01C 21/3661 704/235 |
| 2016/0224081 A1 * | 8/2016 | Worthington | G06N 5/02 |

* cited by examiner

*Primary Examiner* — Adam R Mott
(74) *Attorney, Agent, or Firm* — Michael Spenner; Brooks Kushman P.C.

(57) ABSTRACT

A telematics device of a vehicle, comprising includes a temperature sensor to sense temperature of the telematics device; and a processor in communication with the temperature sensor. The processor is programmed to disable over-the-air software update functionality responsive to the temperature exceeding a first predefined threshold value, disable hotspot functionality responsive to the temperature exceeding a second predefined threshold value, and disable remote services functionality responsive to the temperature exceeding a third predefined threshold value.

13 Claims, 2 Drawing Sheets

TEMPERATURE-BASED EMBEDDED MODEM FEATURE SCALING

TECHNICAL FIELD

The present disclosure is generally related to a system and method for temperature control of functions of a telematics control unit (TCU).

BACKGROUND

Many modern vehicles are equipped with TCUs that facilitate communication using an embedded cellular modem. Using communications services of the mode, the TCU may provide remote control services (e.g., door unlock, vehicle health alert) as well as in-vehicle infotainment services such as use as WiFi hot spot or for streaming Internet radio. In many vehicles, the TCU is installed on the roof of a vehicle to improve signal reception. However, sun load on the roof may increase the temperature of the TCU when the vehicle is parked outdoor in a sunny day, particularly in the summer.

SUMMARY

In one or more illustrative examples, a telematics device of a vehicle includes a temperature sensor configured to sense temperature of the telematics device; and a processor in communication with the temperature sensor programmed to disable over-the-air software update functionality responsive to the temperature exceeding a first predefined threshold value, disable hotspot functionality responsive to the temperature exceeding a second predefined threshold value, and disable remote services functionality responsive to the temperature exceeding a third predefined threshold value.

In one or more illustrative examples, a method includes disabling a first communications function provided to vehicle components by a telematics control unit (TCU) responsive to a detected temperature of the TCU exceeding a first predefined threshold value; disabling a second communications function provided to the vehicle components by the TCU responsive to the temperature exceeding a second predefined threshold value; and disabling a third communications function provided to the vehicle components by the TCU responsive to the temperature exceeding a third predefined threshold value.

In one or more illustrative examples, a telematics control unit (TCU) installed on a vehicle includes a controller, configured to generate a malfunction message responsive to an indication that a first temperature of a first TCU component is higher than a second temperature for greater than a threshold period of time, wherein the second temperature is indicative of temperature of a vehicle component other than the first TCU component.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

Various components of the TCU, such as the cellular modem, have temperature thresholds within which the components should remain facilities proper operation and avoid damage. The present disclosure proposes a TCU functionality scaling scheme based on comparison of TCU temperature to a plurality of temperature levels. Different functions of the TCU may accordingly be enabled or disabled responsive to the TCU meeting different temperature conditions.

Figure 1:
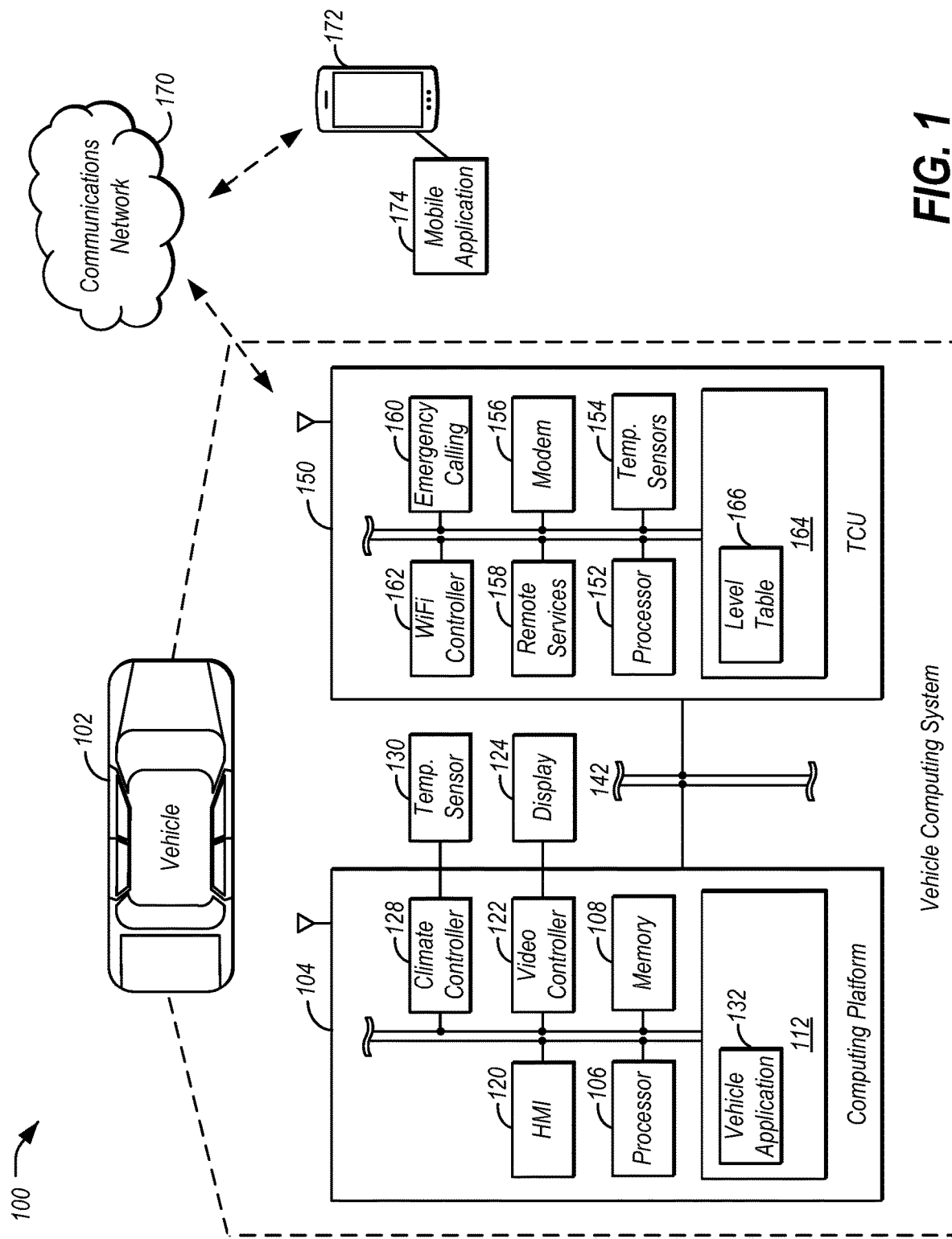
FIG. 1 illustrates an example block topology of a vehicle system of one embodiment of the present disclosure.

FIG. 1 illustrates an example diagram of a system 100 that may be used for the TCU 150 multi-level feature scaling scheme for a vehicle 102. The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instruction of vehicle application 132 to provide features such as navigation, satellite radio decoding, hand-free calling, and provisioning of a WiFi hotspot to vehicle 102 occupants. Such instructions and other data may be maintained in a nonvolatile manner using a variety of types of computer-readable storage medium 112. The computer-readable medium 112 (also referred to as a processor-readable medium or storage) includes any non-transitory medium (e.g., tangible medium) that participates in providing instructions or other data that may be read by the processor 106 of the computer platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 120 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.). The computing platform 104 may also drive or otherwise communicate with one or more displays 124 configured to provide visual output to vehicle occupants by way of a video controller 122. In some cases, the display 124 may be a touch screen further configured to receive user touch input via the video controller 122, while in other cases the display 124 may be a display only, without touch input capabilities.

The computing platform 104 may include a climate controller 128 configured to control a climate system of the vehicle 102 using temperature date received from a temperature sensors 130. The temperature sensors 130 may include various types of temperature measurement devices, such as thermostats, thermistors, resistive temperature detectors (RTDs), or thermocouples as some possibilities. The temperature sensors 130 may include a plurality of temperature sensors installed at various parts of the vehicle 102 to sense the ambient temperature.

The computing platform 104 may be configured to communicate with a TCU 150 via one or more in-vehicle network 142. The in-vehicle network 142 may include, as some examples, one or more of a controller area network (CAN), an Ethernet network, and a media oriented system transport (MOST), as some examples. The TCU 150 may include a WiFi module 162 configured to provide WiFi and Internet connectivity to wireless devices located within the vehicle 102 cabin (not shown). The TCU 150 may include a remote services module 158 configured to provide remote controls to the vehicle 102. For instance, the remote services module enables a user of the vehicle 102 to control some operations of the vehicle 102 (e.g., door lock/unlock, engine start/stop) using a mobile device 172 having a mobile application 174 installed via a cellular network. The TCU 150 may further include an emergency calls module 160 configured to automatically make contact to an operator (e.g., a 911 operator) in case of emergency. Additionally or alternatively, the user of the vehicle 102 may manually trigger the emergency calls module 160 to contact the operator. For instance, the user may push a button of the HMI controls 120 to manually trigger the emergency calls module 160.

The TCU 150 may include a wireless modem 156 configured to connect the TCU 150 to a cellular network 170 to provide various wireless services such as satellite radio, Internet, and phone calls. In one embodiment, the TCU 150 is located on the roof of the vehicle 10 for better signal reception to the cellular network 170. When the vehicle 102 is in a key-on mode, the TCU may be configured to provide telematics services. When the vehicle 102 is in a key-off mode, the TCU 150 may be configured to turn off to save battery. For instance, the TCU 150 may direct the wireless modem 156 to enter a discontinuous reception (DRx) mode in which the wireless modem 156 is partially active and can wake up responsive to reception of data.

The TCU 150 may further include a processor 152 configured to control the operation of the TCU 150. As an example, the processor 152 may be configured to control the operation of the TCU 150 responsive to a temperature data from temperature sensors 154 of the TCU 150. The temperature sensors 154 may include a plurality of temperature sensors 154 configured to monitor the temperature of the TCU 150. The temperature sensors 154 may be mounted at various parts of the TCU 150. For instance, temperature sensors 154 may be mounted inside the TCU 150 housing, outside the TCU 150 housing, and/or near various components (e.g., the wireless modem 156) to sense temperatures of the TCU 150. The processor 152 may be configured to determine the temperature of the TCU 150 using multiple temperature data sent from those temperatures sensors 154. For instance, the processor 152 may calculate an average temperature using those multiple temperature data and use the average temperature as the TCU temperature. Alternatively, the processor 152 may take each temperature data separately to determine the temperature of various parts of the TCU 150.

The processor 152 may be configured to implement the multi-level scaling scheme to enable or disable different functions of the TCU 150 based on the level of temperature of the TCU 150. For instance, the processor 152 may be configured to scale back the operation of the TCU 150 by disabling functions of the TCU 150 responsive to the temperature increases to at least a first temperature level; and further scale back the operation when the temperature increases to at least a second temperature level higher than the first temperature level.

The TCU 150 may include a storage 164 maintaining a level table 166. The level table 166 may include information indicative of the various functions that should be enabled or disabled within different temperature ranges. An example level table 166 is illustrated in Table 1 below.

TABLE 1

Example Level Table.

| Scaling level | Temperature (° C.) | Disabled functions |
|---|---|---|
| 0 | <80 | None |
| 1 | 80-85 | OTA software update |
| 2 | 85-90 | WiFi, Internet |
| 3 | >90 | Remote services |

As illustrated in Table 1, an example multi-level scaling scheme is divided into four levels (i.e., 0, 1, 2, and 3 as shown). At scaling/temperature level 0, when the temperature of the TCU 150 is below 80° C. (approximately 176° F.), the TCU 150 is fully operational and no functionality of the TCU 150 is disabled.

At level 1, when the temperature of the TCU 150 is between 80° C. and 85° C. (approximately 185° F.), the processor 152 is configured to disable the over-the-air (OTA) software update function. For instance, under normal condition the OTA software update function may be implemented by the processor 106 executing instructions of vehicle application 132 at the computing platform 104 to update software stored in the storage 112. The computing platform 104 may be configured to download update data from a server (not shown) via the cellular network 170 through the modem 156 of the TCU 150. When the temperature of the TCU 150 reaches the predefined level, which in this case is between 80° C. and 85° C., the processor 152 may be configured to disable the OTA software update function by sending a disable signal to the computing platform 104 via the in-vehicle network 142 requesting that the computing platform 104 not use the TCU 150 for downloading software updates. In response to the disable signal from the processor 152, the processor 106 of the computing platform 104 may suspend the OTA software update process. At a later time, the TCU 150 temperature may drop back to level 0, e.g., below 80° C. Responsive to the drop of the temperature, the processor 152 may be configured to send an enable signal to the computing platform 104. The processor 106 may resume the OTA software update process responsive to receipt of the enable signal by the computing platform 104. It is noted that the range of temperature and the disabled function of OTA software update at level 1 is merely an example as well as disablement of software updates in the first level. Other temperature ranges may be used and other functions may be disabled in different examples. Notably, the OTA software update function is disabled at an early level in this example, because software updating may be bandwidth-intensive and mat cause the TCU 150 to generate additional heat, but is not real-time time critical.

Continuing with the example multi-level scaling scheme of Table 1, at level 2, when the temperature of the TCU 150 is between 85° C. and 90° C. (approximately 194° F.), the processor 152 is configured to disable further functions in addition to the disabled functions in level 1. As an example, the processor 152 may be configured to disable the WiFi and Internet functions by disabling the WiFi module 162. The processor 152 may be further configured to notify the disablement to the user who may intend to use such services and connect to the WiFi. The processor 152 may send a signal to the computing platform 104 indicative of the disablement of such functions. Responsive to the signal, the computing platform 104 may be configured to display a short message on the display 124 via the video controller notifying the user of the disablement. When the TCU temperature drops back to level 1, e.g., below 85° C., the processor 152 may be configured to reenable the WiFi module 162 by sending an enable signal to the computing platform 104 indicative of the enablement of those functions. Responsive to the enable signal, the computing platform 104 may be configured to display a short message on the display 124 via the video controller notifying the user of the enablement.

At level 3 of the example multi-level scaling scheme, when the temperature is above 90° C., the processor 152 is configured to disable further functions in addition to the previously disabled functions at levels 1 and 2. As an example, the processor 152 may be configured to disable the remote services module 158 at level 3. When the remote services module 158 is disabled, the user of the vehicle 102 will be unable to use the mobile application 174 installed in the mobile device 172 to control vehicle 102 functions, such as remote telematics unlocking of doors. To prevent misunderstandings, the processor 152 may be further configured to send a signal indicative of the disablement of the remote services module 158 to the mobile device 172 via the cellular network. Responsive to the signal from the processor 152, mobile application 174 may be configured to display a message on the mobile device 172 letting the user know about the disablement. Alternatively and/or additionally, the mobile application 174 may be further configured to disable the remote services function on the mobile device 172 to prevent the user from using the such functions. When the TCU temperature drops back to level 2, e.g., below 90° C., the processor 152 may be configured to enable the remote services module 158 and send a signal to the mobile device 172 indicative of the enablement of those functions. Responsive to the signal, the mobile application 174 may display a short message notifying the user of the enablement and/or re-enable those functions of the mobile application 174.

It is noted that in the above example, the emergency calls module 160 remains enabled regardless of TCU temperature. This is due to the importance of being able to make emergency calls at any time outweighs the potential danger to damage the TCU 150 by operation at high temperature. Alternatively, the processor 152 may be configured to disable the emergency calls module 160 at temperature level 3, or at other temperatures. For instance, the TCU 150 may allow the user to choose via the HMI control 120 of the computing platform 104. The user may select whether he/she wants the emergency calls function to be enabled or disabled when the TCU temperature is high.

In another example, the processor 152 may be configured to detect a malfunction of the TCU 150 by identifying a temperature discrepancy between the TCU temperature sensed by the TCU temperature sensor 154 and the ambient temperature sensed by temperature sensors 130 of the climate controller 128. The processor 152 may be configured to communicate with the temperature sensors 130 via the in-vehicle network 142 and receive ambient temperature data from sensors 130. The processor 152 may be configured to compare the TCU temperature with the ambient temperature. In normal working conditions, these two temperatures should be consistent. For instance, a difference between the ambient temperature and the TCU temperature should be within a predefined threshold amount (e.g., 5° C.). However, if the TCU temperature is significantly higher than the ambient temperature, e.g., the difference between the TCU temperature and the ambient temperature is greater than the threshold, it is possible that some components of the TCU 150 has encountered a malfunction and as a result is generating excessive heat. This may be particularly true when the discrepancy lasts for a period of time (e.g., a few minutes). In this case, the processor 152 may be configured to generate an error message and send the message to the computing platform 104 or to the mobile device 172 to notify the user.

Additionally and/or alternatively, the same principle also applies to temperature discrepancies between various components of the TCU 150 itself sensed by different TCU temperature sensors 154. For instance, when the temperature sensor 154 near the wireless modem 156 detects a temperature that is significantly higher than temperatures sensed by other temperature sensors 154 farther away from the wireless modem 156, it is possible that the wireless modem 156 has encountered a malfunction. The processor 152 may be configured to report an error message indicative of the possible wireless modem 156 malfunction to the user through the computing platform 104 and/or the mobile device 172.

Figure 2:
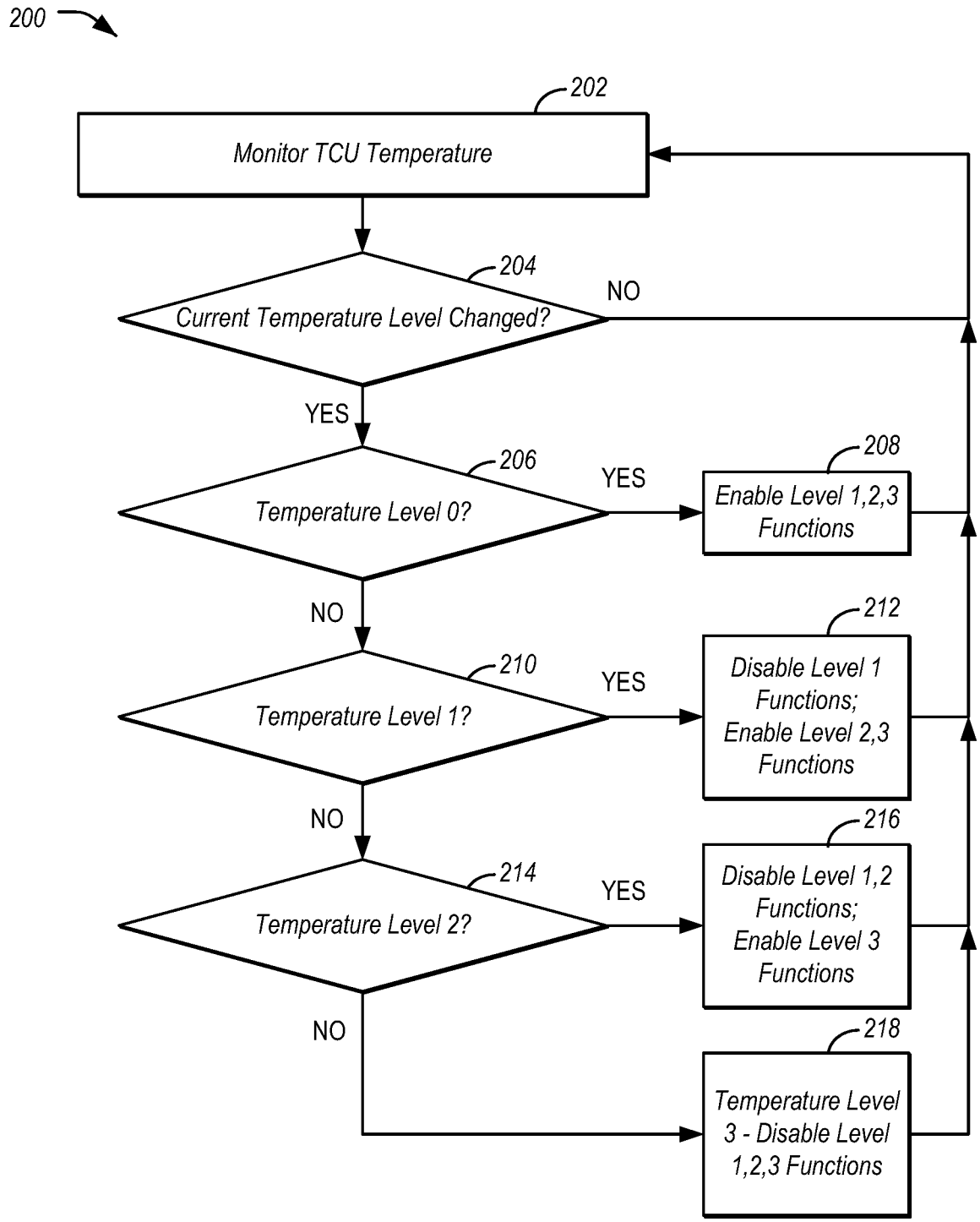
FIG. 2 illustrates an example flow diagram of the process for controlling the operation of the TCU as a part of the multi-level scaling scheme of the present disclosure.

FIG. 2 illustrates an example flow diagram of a process 200 for controlling the operation of the TCU 150 as a part of the multi-level scaling scheme. With reference to the system 100 illustrated in FIG. 1 and Table 1, at operation 202, the processor 152 monitors the TCU temperature using data received from the temperature sensors 154. As an example, the processor 152 periodically samples the data from the temperature sensors 154 every predefined period of time (e.g., every 3 seconds).

At operation 204, the processor 152 determines whether the current temperature sensed by the temperature sensors 154 has changed from one level to another. This may be done, for instance, by categorizing the current temperature into a level using a level table 166 previously recorded into the TCU and determining whether the current level is different from the previous level determined by a previously sensed temperature. If no previous temperature level is available, the control module may be configured to use level 0 as the default previous temperature level. If at operation 204, the processor 152 determines that the current temperature level has not changed, the control returns to operation 202 and the processor 152 continues monitoring the TCU temperature. If the processor 152 determines that the temperature level has changed, the control passes on to determine which level is the current TCU temperature at.

At 206, the processor 152 determines whether the current temperature is at level 0. As an example, this may be done by referring to a level table 166 such as the Table 1 shown above. If the processor 152 determines that the current temperature is at level 0, the control passes to operation 208. At operation 208, the processor 152 enables all functions of the TCU 150. If processor 152 determines that the current temperature is not at level 0, the control passes to operation 210.

At operation 210, the processor 152 determines whether the current temperature is at level 1. If the processor 152 determines that the current temperature is at level 1, the control passes to operation 212. At operation 212, the processor 152 disables level 1 functions and enables levels 2 and 3 functions. With reference to example level table 166 shown in Table 1, the processor 152 may be configured to disable the OTA software update function, and enable WiFi, Internet and the remote control functions. The processor 152 may be further configured to notify the computing platform 104 and/or the mobile device 172 about the disablement and/or enablement through the in-vehicle network 142 and/or the cellular network 170 respectively. If processor 152 determines that the current temperature is not at level 1, the control passes to operation 214.

At 214, the processor 152 determines whether the current temperature is at level 2. If the processor 152 determines that the current temperature is at level 1, the control passes to operation 216. At operation 216, the processor 152 disables levels 1 and 2 functions and enables level 3 functions. It is noted that if the previous temperature level is level 1, those functions that are disabled at level 1 are not affected and kept disabled. With reference to example level table 166 shown in Table 1, the processor 152 may be configured to disable the OTA software update and WiFi, Internet functions, and enable the remote control functions. The processor 152 may be further configured to notify the computing platform 104 and/or the mobile device 172 about the disablement and/or enablement through the in-vehicle network 142 and/or the cellular network 170 respectively. If processor 152 determines that the current temperature is not at level 2, the only possibility left is temperature level 3 and the control passes to operation 218.

The control module disables all levels 1, 2 and 3 functions at 218. It is noted that if the previous temperature level is levels 1 or 2, those functions that are disabled at levels 1 or 2 are not affected and kept disabled. With reference to example level table 166 shown in Table 1, the processor 152 is configured to disable all of the OTA software update, WiFi, Internet and remote control functions. The processor 152 may be further configured to notify the computing platform 104 and/or the mobile device 172 about the disablement through the in-vehicle network 142 and/or the cellular network 170 respectively.

Variations on the described systems and methods are possible. For example, different threshold temperatures may be used, more or fewer levels may be used, and/or additional or different functionality to be disabled may be used for one or more levels.

Computing devices described herein, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A telematics device of a vehicle, comprising:
    a temperature sensor configured to sense temperature of the telematics device; and
    a processor in communication with the temperature sensor programmed to
        disable over-the-air software update functionality responsive to the temperature exceeding a first predefined threshold value,
        disable hotspot functionality responsive to the temperature exceeding a second predefined threshold value higher than the first threshold value, and
        disable remote services functionality responsive to the temperature exceeding a third predefined threshold value higher than the second threshold value.

2. The telematics device of claim 1, wherein the processor is further programmed to send an alert to a server responsive to identifying the temperature as being above the first predefined threshold.

3. The telematics device of claim 1, wherein the vehicle includes a computing platform in communication with a human machine interface (HMI), and the processor is further programmed to, responsive to the temperature being above the first predefined threshold, send a overtemperature alert to the computing platform to be output on the HMI.

4. The telematics device of claim 1, wherein the processor is further programmed to report a malfunction responsive to a difference between a temperature sensed by the temperature sensor of the telematics device and a temperature sensed by a temperature sensor of the vehicle being greater than a predefined threshold difference.

5. The telematics device of claim 1, wherein the processor is programmed to enable a set of temperature-controlled functions of the telematics device responsive to the processor determining that the temperature of the telematics device is below the first predefined threshold.

6. The telematics device of claim 5, wherein the processor is programmed to disable the set of temperature-controlled functions of the telematics device but maintain emergency calling capability responsive to the processor determining that temperature of telematics device is above a second predefined threshold, wherein the second predefined threshold is greater than the first predefined threshold.

7. The telematics device of claim 1, wherein the first predefined threshold value, the second predefined threshold value, and the third predefined threshold value are stored to a memory of the telematics device.

8. A telematics control unit (TCU) installed on a vehicle, comprising:
    a controller, configured to generate a malfunction message responsive to an indication that a first temperature of a first TCU component is higher than a second temperature for greater than a threshold period of time, wherein the second temperature is indicative of temperature of a vehicle component other than the first TCU component.

9. The TCU of claim 8, wherein the second temperature is indicative of temperature of a second TCU component.

10. The TCU of claim 8, wherein the second temperature is indicative of an ambient temperature of the vehicle.

11. The TCU of claim 8, wherein the controller is further configured to disable a function of the TCU when the first temperature is higher than the second temperature for more than the threshold.

12. The TCU of claim 11, wherein the disabled function is a wireless modem function.

13. The TCU of claim 11, wherein the controller is further configured to maintain availability of emergency service regardless of the first temperature.

* * * * *